United States Patent [19]

Yamaguchi et al.

[11] Patent Number: 4,764,423
[45] Date of Patent: Aug. 16, 1988

[54] ABRASIVE TAPE

[75] Inventors: Nobutaka Yamaguchi; Eiichi Tadokoro, both of Odawara, Japan

[73] Assignee: Fuji Photo Film Co., Ltd., Japan

[21] Appl. No.: 920,267

[22] Filed: Oct. 17, 1986

[30] Foreign Application Priority Data

Oct. 18, 1985 [JP] Japan .................. 60-232502

[51] Int. Cl.[4] .............................. G11B 5/71
[52] U.S. Cl. ................... 428/323; 428/329; 428/694; 428/695; 428/900
[58] Field of Search .......... 428/694, 695, 323, 329, 428/900

[56] References Cited

U.S. PATENT DOCUMENTS

| | | | |
|---|---|---|---|
| 4,448,842 | 5/1984 | Yamaguchi et al. | 428/694 |
| 4,474,848 | 10/1984 | Yamaguchi et al. | 428/694 |
| 4,515,857 | 5/1985 | Kitamoto et al. | 428/328 |
| 4,546,038 | 10/1985 | Yamaguchi et al. | 428/329 |

Primary Examiner—Paul J. Thibodeau
Attorney, Agent, or Firm—Gerald J. Ferguson, Jr.

[57] ABSTRACT

An abrasive tape comprises a flexible non-magnetic substrate, and an abrasive coating film applied onto the flexible non-magnetic substrate and formed by kneading an abrasive material, a binder, and a lubricant essentially consisting of a fatty acid, a fatty acid ester, a silicone oil, and a surface active agent.

2 Claims, 1 Drawing Sheet

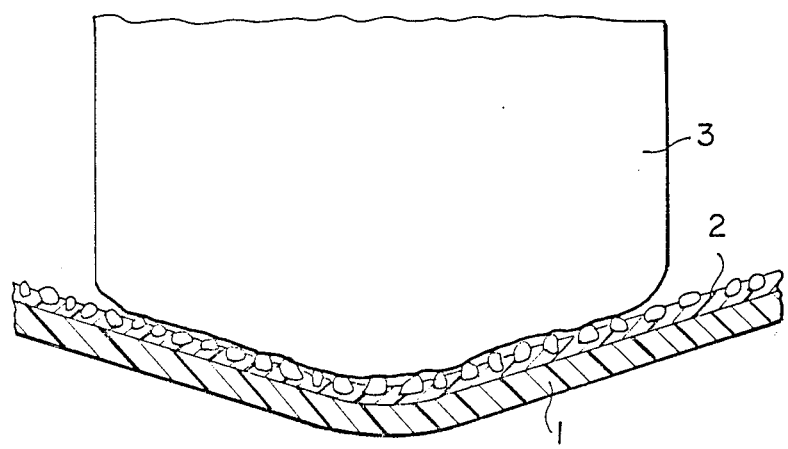

ABRASIVE TAPE

BACKGROUND OF THE INVENTION

1. Field of the Invention

This invention relates to an abrasive tape for use in the polishing of a magnetic head for a magnetic recording and reproducing apparatus. This invention particularly relates to an abrasive tape moved between two reels like an ordinary magnetic tape for polishing the magnetic head.

2. Description of the Prior Art

Video or high grade audio magnetic heads are required to have very smooth tape sliding surfaces. Therefore, in general, in the process of making the magnetic head, the tape sliding surface of the magnetic head is given a smooth finish by disposing the magnetic head at a predetermined position after rough grinding, and moving an abrasive tape between two reels with the magnetic head intervening therebetween. The abrasive tape comprises a nonmagnetic substrate, and fine abrasive particles, a binder, a lubricating agent or the like coated on the substrate. Since the abrasive tape is flexible, it can accurately polish the tape sliding surface of the magnetic head by snugly fitting to the curved shape thereof.

The magnetic head has heretofore been provided with a single lubricating agent as an additive for improving the sliding of the abrasive tape with respect to the magnetic head.

However, with a single lubricating agent, it is not possible to substantially achieve the lubricating effects under specific conditions. Specifically, in a high temperature atmosphere, sticking and slipping of the abrasive tape on the tape sliding surface of the magnetic head occurs even though the back tension of the abrasive tape is adjusted to a predetermined value. In this case, movement stability of the abrasive tape is lost, and it is impossible to polish the magnetic head uniformly.

SUMMARY OF THE INVENTION

The primary object of the present invention is to provide an abrasive tape which exhibits excellent lubricity under every condition during polishing of a magnetic head.

Another object of the present invention is to provide an abrasive tape which exhibits good movement stability and polishes the magnetic head uniformly.

The present invention provides an abrasive tape comprising a flexible non-magnetic substrate, and an abrasive coating film applied onto said flexible non-magnetic substrate and formed by kneading an abrasive material, a binder, and a lubricant essentially consisting of a fatty acid, a fatty acid ester, a silicone oil, and a surface active agent.

In the present invention, a plurality of the lubricating agents having different advantages are combined and contained in the coating layer so that the coating layer substantially exhibits lubricity under every condition. Since the fatty acid exhibits polarity, it has the property of gradually spreading from the inside of the coating layer to the surface thereof. The fatty acid ester exhibits no combined, it is possible to obtain higer lubricating effects polarity, and therefore has the property of immediately spreading to the surface of the coating layer. With a small amount of the silicone oil the silicone oil exhibits the lubricating effects regardless of the material of the mating member on which the abrasive tape should slide. The surface active agent does not lose the lubricating effects even at high temperatures and high pressures.

The lubricant is not necessarily limited to the liquid form, and broadly embraces also the solid form, for example, a solid surface active agent.

Also, the abrasive tape broadly embraces a long strip-like form, a disk-like form and a sheet-like form.

With the abrasive tape in accordance with the present invention, since the coating layer contains the fatty acid, the fatty acid ester, the silicone oil and the surface active agent which exhibit different advantages as lubricating agents, at least one of the four lubricating agents exhibits the lubricating effects under various conditions. Therefore, even though the material of the magnetic head which is to be polished with the abrasive tape changes, or the tension of the abrasive tape is changed, or the magnetic head is adjusted to a high temperature, high humidity and a high pressure, lubricity of the abrasive tape with respect to the magnetic head is maintained, movement stability of the abrasive tape is always maintained in good condition, and it becomes possible to always polish the magnetic head uniformly.

Also, since the four lubricating agents are than with a single lubricating agent as used heretofore. This is very advantageous in practice.

BRIEF DESCRIPTION OF THE DRAWING

The single drawing is an enlarged sectional view showing an embodiment of the abrasive tape in accordance with the present invention in the use state for polishing a magnetic head.

DESCRIPTION OF THE PREFERRED EMBODIMENTS

The present invention will hereinbelow be described in further detail with reference to the accompanying drawing.

As shown in the drawing, an embodiment of the abrasive tape in accordance with the present invention comprises a flexible non-magnetic substrate 1, and a coating layer 2 overlaid on the substrate 1. The coating layer 2 is formed of an abrasive material, a binder and a lubricant kneaded together. The lubricant consists essentially of a fatty acid, a fatty acid ester, a silicone oil, and a surface active agent. The abrasive material comprises hard abrasive particles of $Cr_2O_3$, $Al_2O_3$, SiC or the like having a Mohs hardness of 6 or higher. The binder consists of a vinyl chloride-vinyl acetate copolymer, a prepolymer having an isocyanate group at a terminal, an organic amine, or the like.

When the abrasive tape is used for polishing the tape sliding surface of the magnetic head 3, the abrasive tape is moved at a predetermined speed from one reel (not shown) to the other reel (not shown) disposed with the magnetic head 3 between the two reels. Thus the coating layer 2 is made to slide on the magnetic head 3. At this time, the tape sliding surface of the magnetic head 3 is polished smoothly by the abrasive particles protruding out of the surface of the coating layer 2. The particle sizes of the abrasive particles may be adjusted in accordance with the purpose, and may be within the range of approximately 16 $\mu$m to 1 $\mu$m for rough finishing, and within the range of approximately 1 $\mu$m to 0.1 $\mu$m for regular finishing.

The binder for dispersing the abrasive particles is prepared by mixing a vinyl chloride-vinyl acetate copolymer which is a comparatively hard binder, a prepolymer having an isocyanate group at a terminal which is a soft binder, with an organic amine as a curing accelerator at appropriate ratios. The binder thus prepared exhibits a flexibility that is higher than that with the conventional binder consisting only of a vinyl chloride-vinyl acetate copolymer. Therefore, it becomes possible to snugly fit the abrasive tape to the curved surface shape of the magnetic head 3.

The lubricant used in the abrasive tape is formed by combining the four lubricating agents having different properties so that the abrasive tape substantially maintains lubricity and good movement stability with respect to the magnetic head 3 under every condition. Specifically, since the fatty acid exhibits polarity, it keeps up lubricity by gradually spreading from the inside of the coating layer 2 to the surface thereof. The fatty acid ester does not exhibit high polarity, and therefore immediately spreads to the surface Of the coating layer 2, thereby providing the lubricating effects from the original stage and improving the tape durability. The silicone oil has no polarity, and in small amounts exhibits the lubricating effects regardless of the material of the mating member on which the abrasive tape should slide. Also, the silicone oil is not readily affected by ambient humidity. The surface active agent has the effects of a dispersing agent, and improves the spreading of various lubricating agents on the surface of the abrasive material. Therefore, the surface active agent acts in the same manner as a lubrication aiding agent for eliminating local variations in distribution of the lubricating agents in the abrasive layer. Particularly, a surface active agent which is solid at normal temperature exhibits the lubricating effects at high temperatures and high pressures.

When the four lubricating agents are combined, it is possible to improve the lubricating property as compared with the case where the lubricating agents are used alone. The effect of improving the lubricating property differs with the mixing ratios among the lubricating agents. Therefore, the ratios of weights of the lubricating agents to the total weight of the lubricant should preferably be such that the ratio of the fatty acid is within the range of 20% to 70% by weight, the ratio of the fatty acid ester is within the range of 5% to 30% by weight, the ratio of the silicone oil is within the range of 0.5% to 20% by weight, and the ratio of the surface active agent is within the range of 5% to 40% by weight. The ratio of the weights of the lubricating agents to the total weight of the lubricant should more preferably be such that the ratio of the fatty acid is within the range of 30% to 60% by weight, the ratio of the fatty acid ester is within the range of 10% to 20% by weight, the ratio of the silicone oil is within the range of 1% to 10% by weight, and the ratio of the surface active agent is within the range of 10% to 30% by weight. As the fatty acid, it is possible to use, for example, behenic acid, stearic acid, palmitic acid, myristic acid, lauric acid, isostearic acid, oleic acid, or eruic acid. As the fatty acid ester, it is possible to use, for example, ethyl stearate, butyl stearate, amyl stearate, butyl palmitate, butyl myristate, butyl laurate, hexyl laurate, or oleyl oleate. As the silicone oil, it is possible to use, for example, dimethyl polysiloxane, diphenyl polysiloxane, or myristic acid-modified silicone. As the surface active agent, it is possible to use, for example, an anionic surface active agent such as a higher alcohol sulfate or phosphate ester, a nonionic surface active agent such as a polyethylene oxide type or a polyhydric alcohol type, a cationic surface active agent such as an aliphatic amine sait or ammonium salt, an ampholytic surface active agent such as a carboxylic acid type or a sulfate ester type, or a mixture of two or more of these surface active agents.

As the non-magnetic substrate 1, it is possible to use, for example, polyethylene terephthalate (PET) or polyethylene-2,6-naphthalate.

If the thickness of the coating layer 2 is too large, contact of the abrasive tape with the magnetic head becomes bad, depending on the shape and material of the magnetic head 3. Therefore, the thickness of the coating layer 2 should preferably be not larger than 50 $\mu$m.

The present invention will further be illustrated by the following nonlimitative example.

EXAMPLE

An abrasive tape 1 was prepared by applying a coating composition as shown below onto a 25 $\mu$m-thick polyethylene terephthalate (PET) substrate. The parts in the following descriptions are parts by weight.

| Coating composition: | |
| --- | --- |
| $\gamma$-Fe$_2$O$_3$ | 300 parts |
| (Size: 1.0 $\mu$m $\times$ 0.1 $\mu$m $\times$ 0.1 m) | |
| Cr$_2$O$_3$ | 150 parts |
| (Size: 0.6 $\mu$m diameter, Mohs hardness: 8) | |
| Vinyl chloride-vinyl acetate-vinyl alcohol copolymer | 80 parts |
| Isocyanate-terminated prepolymer | 60 parts |
| Organic amine | 5 parts |
| Fatty acid | 15 parts |
| (oleic acid supplied by Kanto Kagaku K.K.) | |
| Fatty acid ester | 5 parts |
| (amyl stearate "Ionet FAS" supplied by Sanyo Kasei K.K.) | |
| Silicone oil | 1 part |
| (dimethyl polysiloxane KF-96-100cs supplied by Shin-Etsu Kagaku Kogyo K.K.) | |
| Surface active agent | 7 parts |
| (Elenon No. 10 supplied by Dai-ichi Kogyo Seiyaku K.K.) | |
| Carbon black | 30 parts |
| (particle size: 20 $\mu$m) | |
| Solvent (butyl acetate) | 900 parts |

COMPARATIVE EXAMPLE 1

As a Comparative Example, an abrasive tape 2 was prepared by applying a coating composition as shown below onto a substrate approximately similar to that in the aforesaid Example. The sample obtained by this Comparative Example is the same as Sample No. 24 disclosed in Japanese Unexamined Patent Publication No. 53(1978)-102017.

| Coating Composition: | |
| --- | --- |
| ZnO | 300 parts |
| (Size: 120 $\mu$m diameter, Mohs hardness: 4.5) | |
| Vinyl chloride-vinyl acetate copolymer | 34.7 parts |
| (Copolymerization ratio: 87:13, polymerization degree: 350) | |
| Polyester polyol | 21 parts |
| (reaction product of 1 mol of adipic acid, 1 mol of diethylene glycol, with 0.06 mol of trimethylolpropane; viscosity at 75° C.: 1,000 CP, specific gravity: 1.18, OH value: 60, acid value <2) | |
| Soybean lecithin | 2.4 parts |
| Silicone oil (dimethyl polysilocane) | 0.1 part |
| Polyisocyanate | 18 parts |

-continued

| Coating Composition: | |
|---|---|
| (75 wt % ethyl acetate solution of a reaction product of 3 mols of 2,4-tolylene diisocyanate compound with 1 mol of trimethylolpropane) | |
| Methyl ethyl ketone | 400 parts |
| Toluene | 400 parts |

COMPARATIVE EXAMPLE 2

An abrasive tape 3 was prepared in the same manner as in the Example, except that the silicone oil and the surface active agent were omitted from the coating composition.

| Coating Composition: | |
|---|---|
| $\gamma$-Fe$_2$O$_3$ | 300 parts |
| (Size: 1.0 $\mu$m × 0.1 $\mu$m × 0.1 $\mu$m) | |
| Cr$_2$O$_3$ | 150 parts |
| (Size: 0.6 $\mu$m diameter, Mohs hardness: 8) | |
| Carbon black | 30 parts |
| (particle size: 20 $\mu$m) | |
| Vinyl chloride-vinyl acetate-vinyl alcohol copolymer | 80 parts |
| Isocyanate-terminated prepolymer | 60 parts |
| (Takenate L-1007F) | |
| Organic amine (Cuamine MT) | 5 parts |
| Fatty acid (oleic acid) | 15 parts |
| Fatty acid ester (amyl stearate) | 5 parts |
| Solvent (butyl acetate) | 900 parts |

For the abrasive tapes of the Example and the Comparative Examples 1 and 2, the head polishing time, the generation of scratches on the head surface after the polishing, and the head yield were investigated. The results were as shown in Table 1.

TABLE 1

| | Head polishing time | Scratch on head surface | Head yield |
|---|---|---|---|
| Example | Approx. 10 sec. | None | 100% |
| Comparative Example 1 | Approx. 5 min. | Many Scratches | 0% |
| Comparative Example 2 | Approx. 10 sec. | Few Scratches | 65% |

In Table 1, the head polishing time was the time required for polishing the ferrite head by 1 $\mu$m. As for the scratches on the head surface, scratches having a width of 2 $\mu$m or larger were investigated by microscopic observation of the gap surface of the magnetic head after the polishing. Also, the head yield was the ratio of magnetic heads having no scratch on the head surface obtained after polishing.

As is clear from Table 1, the head surface is accurately polished with the abrasive tape in accordance with the present invention, and it is possible to markedly improve the head yield.

We claim:

1. An abrasive tape comprising a flexible non-magnetic substrate, and an abrasive coating film having a thickness not larger than 50 $\mu$m applied onto said flexible non-magnetic substrate and formed by kneading an abrasive material having a Mohs hardness of 6 or more, a binder, and a lubricant essentially consisting of a fatty acid, a fatty acid ester, a silicone oil, and a surface active agent, wherein said lubricant essentially consists of said fatty acid in a ratio within the range of 20% to 70% by weight with respect to the total weight of said lubricant, said fatty acid ester in a ratio within the range of 5% to 30% by weight with respect to the total weight of said lubricant, said silicone oil in a ratio within the range of 0.5% to 20% by weight with respect to the total weight of said lubricant, and surface active agent in a ratio within the range of 5% to 40% by weight with respect to the total weight of said lubricant.

2. An abrasive tape as defined in claim 1 wherein said lubricant essentially consists of said fatty acid in a ratio within the range of 30% to 60% by weight with respect to the total weight of said lubricant, said fatty acid ester in a ratio within the range of 10% to 20% by weight with respect to the total weight of said lubricant, said silicone oil in a ratio within the range of 1% to 10% by weight with respect to the total weight of said lubricant, and said surface active agent in a ratio within the range of 10% to 30% by weight with respect to the total weight of said lubricant.

* * * * *